March 26, 1957  H. W. SIMPSON  2,786,369
PLANETARY TRANSMISSION
Filed Feb. 6, 1953  2 Sheets-Sheet 1
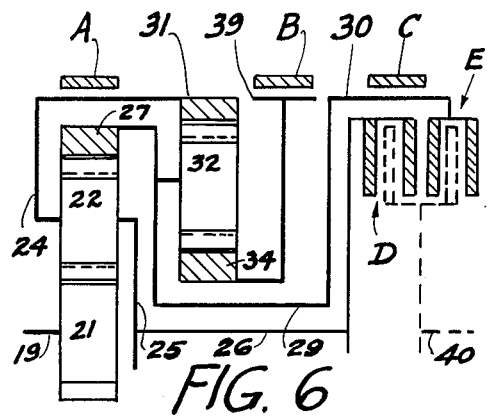
FIG. 6
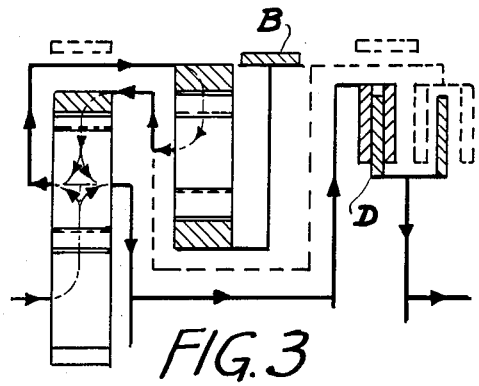
FIG. 3
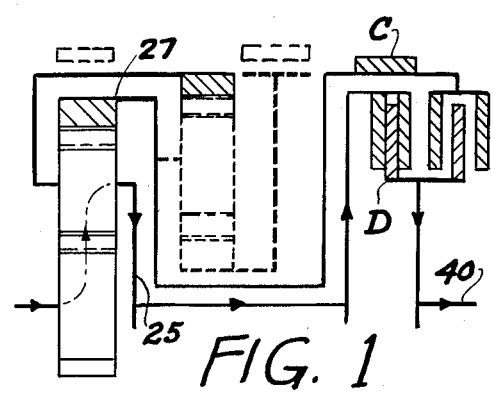
FIG. 1
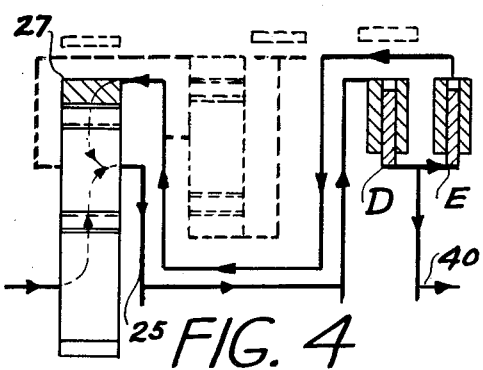
FIG. 4
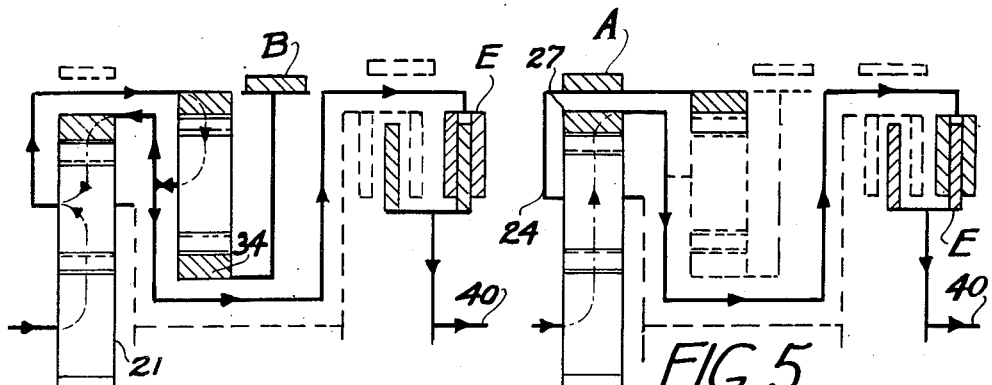
FIG. 2
FIG. 5
INVENTOR.
Howard W. Simpson.

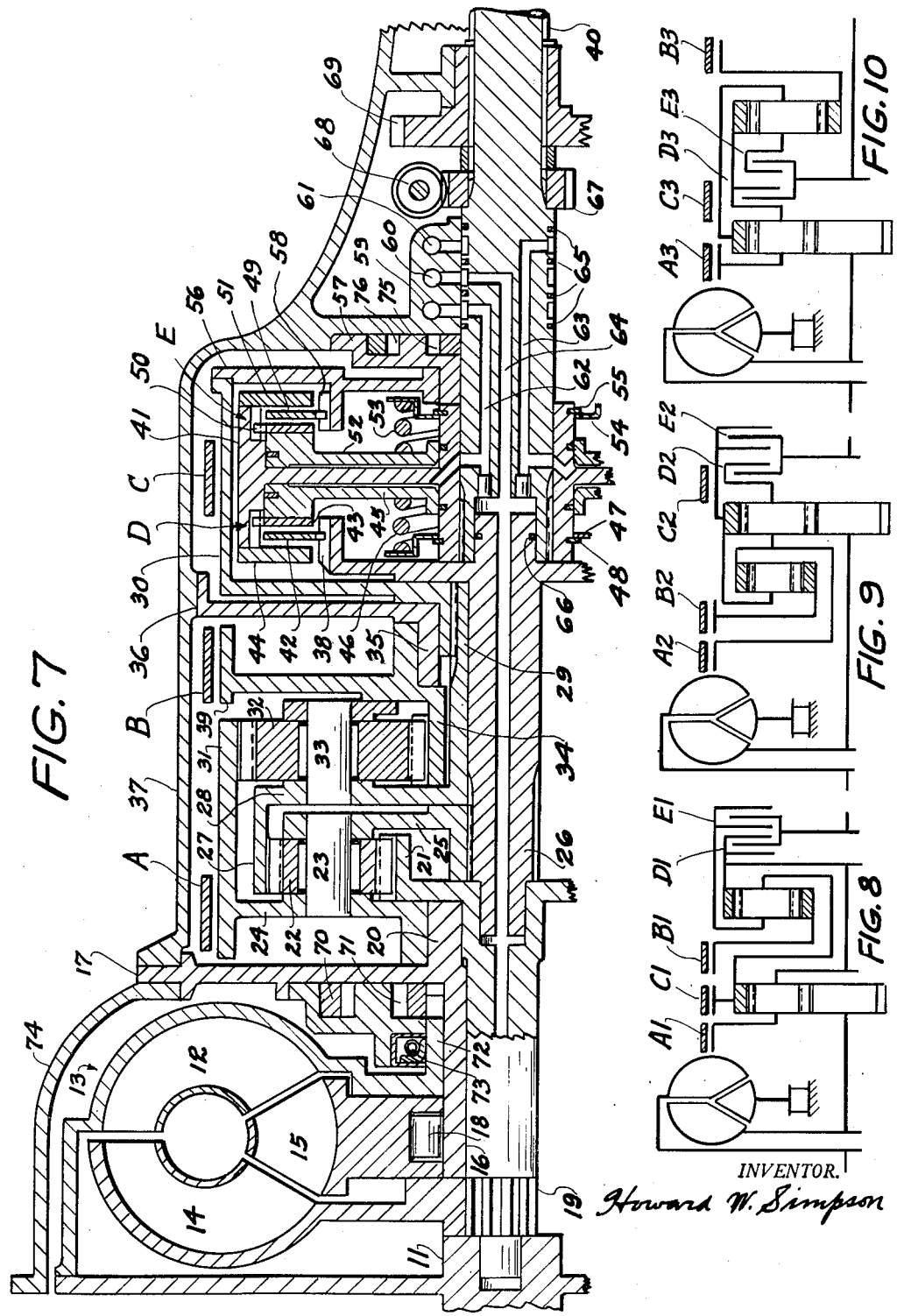

United States Patent Office 2,786,369
Patented Mar. 26, 1957

2,786,369

PLANETARY TRANSMISSION

Howard W. Simpson, Dearborn, Mich.

Application February 6, 1953, Serial No. 335,495

9 Claims. (Cl. 74—759)

This invention relates to a four speed planetary transmission for the converting and transmitting of power in self propelled vehicles. In particular, it is a novel combination of a hydrodynamic device, planetary gearing, driving, driven and supporting members, friction clutches of the disc or plate type, reaction members and friction brakes for holding these reaction members, and hydraulic control members combined to operate the mechanism in various forward speeds and reverse. The input member, in all speeds, is the sun gear of the front gear set.

Low and reverse are obtained in the front set of gears by holding respectively the ring gear and carrier as reaction members, and allowing the rear set of gears to idle.

In 2nd and 3rd speeds both sets of gears are coupled differentially with the second sun gear held as a reaction member in both of these speeds.

In 4th speed the gears are locked by engaging both clutches to produce a direct drive. Hydraulic pressure enters the output shaft to operate the two clutches and conventional front and rear pumps are shown as sources of pressure and are driven by the engine shaft and output shaft respectively. The hydraulic control system is not shown or described in detail as it is not a part of this invention.

A novel feature of this disclosure is my arrangement of the above elements to provide selective means of coupling the gears in differential relationship in two different ways, thus yielding a greater number of reduction ratios than ordinarily possible with as few gears, clutches and brakes.

Specifically, in 2nd and 3rd speeds there is a split path of torque through the two gear sets. In 2nd speed the output is the algebraic sum of the torques of the first ring gear and the second carrier, while in 3rd speed output torque is the algebraic sum of the torques of the second ring gear and the first carrier.

Another major object of my present disclosure is to produce a transmission in which the frictional drag loss at the clutch plates is negligible. Formerly such losses were of little consequence because almost all of the operation was in direct drive with all clutches engaged. But the present practice in automobile design is to use rear axle gear ratios of about 3:1 to reduce engine noise in direct drive at fast road speeds. Consequently it is necessary to drive much of the time, especially in cities, through a gear reduction in the transmission as, for instance, in third speed of a four speed transmission.

In trucks and tractors low clutch drag is of even more importance because the more frequent and continuous use of transmission gear reductions.

It is well known that the drag loss in a plate clutch may be ten times that of a band brake at the same speed but that this is reduced more than directly proportional to the speed, when the differential of the clutch plates is lowered. Therefore by lowering the relative speeds of the plates, as in this disclosure, the clutch drag losses are greatly reduced and a larger percentage of useful power is delivered to the vehicle wheels.

Another object of my invention is to provide smooth speed changes under continuous power input without the occurrence of irritating sharp variations in output torque. Although the brake bands are self-energizing in one direction of rotation, all shifts are smooth when each band engages its drum because, at the time of each shift to a different speed, the brake drum being engaged is rotating in the non-energizing direction except in one instance i. e., the shift from 1st to 2nd speed. In this case a simultaneous shift from one clutch to the other smooths out and prevents undesirable momentary fluctuation of output torque.

Another object is to provide gearing which is inherently quiet by virtue of low tooth engagement speeds which I have provided in all speed ratios and in neutral in this disclosure.

Another object is to provide a low cost compact unit in which only two simple gear trains are used and with a single clutch housing for two clutches having identical parts.

Another object is to provide a transmission in which the gear elements are grouped compactly together at the front end of the unit, and the clutches at the rear end for easy access to hydraulic pressure without multiple glands.

Another object is to provide a transmission free from radial brake loads, which I accomplish by providing stationary hub supports for the brake drums.

These and other objects will become apparent as the following drawings are viewed with respect to the accompanying specification.

Figs. 1 to 6 are diagrammatic partial section elevations of the gear unit only showing the path of power and the brakes and clutches which are engaged and released to obtain each speed and neutral. In Figs. 1 to 5 the loaded or working parts are shown in solid lines and the non-working parts in dotted lines.

Fig. 7 is a simplified elevation in partial section of the transmission in neutral with the brakes and clutches released. For maximum clarity, various parts not vital to illustrate the present embodiment, such as screws, washers and bushings, are not shown. Likewise the clutches are simplified by showing only one driving plate each instead of several as would be the case in a commercial unit.

Figs. 8, 9 and 10 are diagrammatic partial section elevations showing optional arrangements. The same elements are connected to each other as in Fig. 7 and have the same function as in the preferred arrangement of Fig. 7. These are shown to illustrate a few of the possible variations that can be made without departing from the spirit or scope of the invention.

In Fig. 7 engine shaft 11 drives converter 13 in bell housing 74. Converter pump 12 drives turbine 14. Reactor 15 is rotatably mounted on hub 16 of housing flange 17 and is held by one way clutch 18 from turning backward. Turbine 14 is splined to input shaft 19, which is piloted in engine shaft 11 and the hub, 20, of housing flange 17. Sun gear 21 of the first planetary set is integral with input shaft 19 and meshes with planets 22, one of which is shown mounted on shaft 23. Carrier 24 turns on hub 20 and is attached to carrier flange 25, which is splined to intermediate shaft 26. Ring gear 27, meshing with planets 22, is integral with carrier 28 and sleeve 29, which is splined to drum 30. Flange 56, attached to drum 30 is supported on rear pump housing 57 and has splined drum 58 integral. Ring gear 31 of the second planetary set is integral with carrier 24 and meshes with planets 32, one of which is shown rotatably mounted on shaft 33. Sun gear 34 is rotatably mounted on hub 35 of housing bulkhead 36, which is fixed in housing 37, and drum 30 is also rotatably supported in hub 35. Ring gear 31 serves as a drum for brake band A.

Intermediate shaft 26 turns in sleeve 29, and is piloted in input shaft 19 and output shaft 40, and has clutch drum 38 integral with it. Brake bands A, B, and C hold drums 31, 39 and 30 respectively in various speed ratios and clutches D and E are selectively engageable to transmit the output torque of the gears to output shaft 40 in various speeds. Clutch D, in housing 41, consists of driving and driven plates 42 and 43, pressure plate 44, piston 45, retracting spring 46, held by washer 47, and snap ring 48. Clutch E, also in housing 41, includes splined driving and driven plates 49 and 50, pressure plate 51, piston 52 retracting spring 53, held by washer 54 and snap ring 55.

Output shaft 40 has drilled passages to admit oil under pressure to the clutches and converter, and also has grooves connecting with oil feed holes 59, 60 and 61 in housing 37. Passages 62 and 63 feed clutches D and E respectively, and passage 64 feeds converter 13 (through additional passages not shown), and also supplies lubrication to the various rotating parts through radial oil holes and grooves not shown. Sealing rings 65 and 66 prevent leakage. Clutch drum 41, being splined to output shaft 40, transmits torque from drums 38 and 58 to output shaft 40 when clutches D and E respectively are engaged. Right angle drive gears 67 and 68 drive the governor and speedometer (not shown) and gear 69, splined to output shaft 40, is for a parking lock when a detent (not shown) is engaged to lock it to the housing.

Oil pressure is produced by pump gears 70 and 71, the latter being keyed to the hub 72 of the converter pump 12. Oil seal 73 prevents leakage from the pump gears. Rear pump gear 75 is driven by output shaft 40 by a key not shown and meshes with internal gear 76 in rear pump housing 57. Suitable cored and drilled openings (not shown) provide for suction and delivery of oil to and from pump gears 70, 71, 75 and 76, and to the control mechanism for operating brakes A, B and C and clutches D and E but these elements are omitted as they are not a part of this invention. Also suitable check valves are provided, but not shown, which prevent either set of pump gears from discharging through the others when one set is stationary or turning slowly.

The output shaft is rotatably supported at its front end in pump housing 57 and at its rear end in housing 37 through the hub of parking lock gear 69.

In Figs. 8, 9 and 10 respectively the brake bands and clutches correspond to those in Fig. 7 as follows:

A1, B1, C1, D1 and E1 correspond to A, B, C, D and E.
A2, B2, C2, D2 and E2 correspond to A, B, C, D and E.
A3, B3, C3, D3 and E3 correspond to A, B, C, D and E.

*Operation*

In low, brake C holds ring gear 27 as a reaction member, as shown in Fig. 1, and the multiplied torque of carrier flange 25 is transmitted to output shaft 40 by clutch D.

In 2nd, brake B holds sun gear 34, and the power input from sun gear 21 passes through the two gear sets, as shown by the arrows in Fig. 2, and clutch E transmits it to output shaft 40.

In 3rd, brake B remains engaged as in 2nd but clutch D is engaged instead of E. This causes a rearrangement of the path of power through the two gear sets as shown in Fig. 3.

In 4th, all brakes are released and both clutches engaged as in Fig. 4. The torque to output shaft 40 is then the algebric sum of that from carrier flange 25 transmitted by clutch D, and that of ring gear 27 transmitted by clutch E.

In reverse, brake A holds carrier 24 and the reverse torque at ring gear 27 is transmitted to output shaft 40 by clutch E, as shown in Fig. 5. In neutral all brakes and clutches are released as in Fig. 6.

If R and S are the number of teeth in the ring gear 27 and sun gear 21 of the first gear set and R' and S' the number of teeth for the ring gear 31 and sun gear 34 of the second set the formulae for the reduction ratios are as follows:

$$\text{Low } \frac{R+S}{S}$$

$$\text{2nd } \left(\frac{R'+S'}{R'} \times \frac{R+S}{S}\right) - \frac{R}{S}$$

$$\text{3rd } \frac{R+S}{S} - \left(\frac{R}{R+S} \times \frac{R}{S}\right)$$

$$\text{Rev.} - \frac{R}{S}$$

The brakes are designed to be self-energizing when holding reaction torques. Thus brake band A, being for reverse, is self-energized by forward rotation and brake bands B and C, being for forward speeds, are self-energized by backward rotation of drums 39 and 30 respectively. This provides maximum holding power with small servo cylinders.

Shifting from neutral to low is non-energizing because drum 30 is idling forward slowly in neutral. In low speed, brake drum 39 turns backward and when brake B engages, it self-energizes but a simultaneous shift from clutch D to E smoothes out and prevents rough engagement of second speed. The 2–3 and 3–4 shifts are also smooth because only clutches D and E respectively engage.

The 4–3 shift is smooth because brake drum 39 is turning forward when band B is applied. The 3–2 shift is smooth because only a clutch E engages. The 2–1 shift is smooth because brake drum 30 is turning forward when brake band C is applied.

I do not limit my invention in its broader aspects to any particular combination or arrangement such as shown and described for illustrative purposes in the several embodiments herein, since various modifications will be apparent, to those skilled in the art, from the teachings of my invention within the scope thereof as defined in the appended claims.

I claim:

1. In a power transmission, first and second planetary gear sets, each comprising sun, ring and carrier elements, the sun of the first set being connected to an input member, a first clutch for connecting the carrier of the first set and the ring gear of the second set to an output member, a second clutch for connecting the ring gear of the first set and the carrier of the second set to the said output member, a brake for holding the sun of the second set whereby, when the brake is applied, the first clutch is engaged and the second clutch is released, a gear reduction between the input and output members is obtained, and when the brake is applied, the first clutch is released and the second clutch is engaged, a different gear reduction between the input and output members is obtained.

2. The combination set forth in claim 1 and whereby, when said brake is released and both clutches are engaged, a direct drive through the transmission is obtained.

3. The combination set forth in claim 1, and a brake for holding the ring gear of the first set whereby, when the last mentioned brake is applied, the first clutch is engaged and the second clutch and first mentioned brake are released, a third reduction ratio is obtained between the input and output members.

4. The combination set forth in claim 1 and a brake for holding the carrier of the first set whereby, when the last mentioned brake is applied, the second clutch is engaged, and the first clutch and first mentioned brake are released, a reverse reduction is obtained between the input and output members.

5. In a four speed and reverse transmission, first and second planetary gear sets, each comprising sun, ring and carrier elements having planets meshing with the sun and ring elements, the sun of the first set being connected to an input member, a second element of the first gear set being connected to a first element of the second gear set and a first clutch for connecting the two last mentioned elements to an output member, a third element of the first gear set being connected to a second element of the second gear set and a second clutch for connecting the two last mentioned elements to the said output member, a brake for holding an element of the second gear set whereby, when the brake is applied and the first clutch is engaged, and the second clutch is released, a gear reduction from the input to the output members is obtained and when the brake is applied, the first clutch is released and the second clutch is engaged, a different gear reduction between the input and output members is obtained, fluid pressure servo means effective to actuate said clutches, a brake for holding the elements associated with said first clutch, a brake for holding the elements associated with said second clutch.

6. The combination set forth in claim 5 and whereby, when said brake is released and both of said clutches are engaged, a direct drive through the transmission is obtained.

7. In a multi-speed power transmission, a planetary gear unit comprising two simple planetary gear sets each having a single ring gear, a single sun gear, and a carrier having planet gears meshing with the sun and ring gears, said unit having only one element connected to an input member, a first clutch adapted to couple an element of each set to an output member, a second clutch adapted to couple second elements of each set to said output member, a brake for locking a third element of one of the gear sets against rotation whereby, when the brake is applied and the first clutch is engaged a reduction ratio is obtained between the said input and output members, and when the brake is applied, the first clutch is released and the second clutch is engaged, a different reduction ratio is obtained between the said input and output shafts, a brake for holding said elements adapted to be connected to the output shaft by said first clutch, to obtain a low speed, and a brake for holding said elements adapted to be connected to the output shaft by said second clutch, to obtain a reverse speed.

8. In a power transmission, a planetary gear unit comprising two simple planetary gear sets each having a single ring gear, a single sun gear, and a carrier having planet gears meshing with the sun and ring gears, said unit having a sun gear connected to an input member, a first clutch for coupling the ring gear of one set and the planet gear carrier of the other set to an output member, a second clutch for coupling the ring gear of said other set and the planet gear carrier of said one set to said output member, a brake for holding the other sun gear against rotation whereby when the brake is applied and the first clutch is engaged a reduction ratio is obtained between the said input and output members and when the brake is applied, the first clutch is released and the second clutch is engaged, a different reduction is obtained between the said input and output members, a brake for holding the first named carrier and ring gear and a brake for holding the second named carrier and ring gear.

9. The combination set forth in claim 8 whereby when said brakes are released and both of said clutches are engaged, a direct drive through the transmission is obtained.

References Cited in the file of this patent

UNITED STATES PATENTS

| | | |
|---|---|---|
| 2,259,729 | Burtnett | Oct. 21, 1952 |
| 2,620,685 | Smirl | Dec. 9, 1952 |
| 2,631,476 | Ravigneaux | Mar. 17, 1953 |